(12) United States Patent
Swaminathan

(10) Patent No.: US 7,343,431 B1
(45) Date of Patent: Mar. 11, 2008

(54) METHOD, APPARATUS, AND COMPUTER-READABLE MEDIUM FOR DISABLING BIOS-PROVIDED CONSOLE REDIRECTION CAPABILITIES IN THE PRESENCE OF AN INCOMPATIBLE COMMUNICATIONS DEVICE

(75) Inventor: Sivaprasath Swaminathan, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 523 days.

(21) Appl. No.: 10/795,845

(22) Filed: Mar. 8, 2004

(51) Int. Cl.
G06F 15/177 (2006.01)
G06F 13/00 (2006.01)
H04B 1/38 (2006.01)

(52) U.S. Cl. .............................. 710/8; 710/10; 710/15; 710/16; 710/18; 710/104; 710/106; 713/1; 713/2; 713/100; 709/217; 709/218; 709/219; 703/23; 703/24; 703/25; 370/278; 370/282; 375/219; 375/220; 375/221; 375/222

(58) Field of Classification Search ................... 713/1, 713/2, 100; 710/8, 10, 15, 16, 18, 19, 104, 710/106; 709/201, 203, 217–222; 703/23–25, 703/27; 375/219–222; 455/557; 370/278, 370/282

See application file for complete search history.

(56) References Cited

U.S. PATENT DOCUMENTS

| | | | | |
|---|---|---|---|---|
| 5,179,661 A | * | 1/1993 | Copeland et al. ............. 710/29 |
| 5,790,895 A | * | 8/1998 | Krontz et al. ................. 710/64 |
| 6,317,798 B1 | * | 11/2001 | Graf ............................. 710/15 |
| 6,560,660 B1 | * | 5/2003 | Flanagin ....................... 710/15 |
| 6,779,047 B1 | * | 8/2004 | Caddes et al. ................ 710/15 |
| 6,865,664 B2 | * | 3/2005 | Budrovic et al. ........... 712/209 |
| 7,043,205 B1 | * | 5/2006 | Caddes et al. ............. 455/41.2 |
| 7,068,386 B2 | * | 6/2006 | Kawanabe ................. 358/1.15 |
| 7,111,090 B1 | * | 9/2006 | Lemke et al. ................. 710/48 |
| 7,120,679 B2 | * | 10/2006 | Remer ......................... 709/220 |
| 2003/0126226 A1 | * | 7/2003 | Ramey ....................... 709/215 |
| 2004/0034764 A1 | * | 2/2004 | Bulusu et al. ................. 713/1 |
| 2005/0055486 A1 | * | 3/2005 | Natu et al. ................... 710/260 |

\* cited by examiner

*Primary Examiner*—Tanh Q Nguyen
(74) *Attorney, Agent, or Firm*—Hope Baldauff Hartman, LLC

(57) ABSTRACT

Methods, systems, apparatus, and computer-readable media are provided for disabling a BIOS-provided console redirection facility in the presence of an incompatible device. According to the method, a determination is made as to whether a port has been enabled for utilization with a BIOS-provided console redirection facility. If it is determined that a communications port has been enabled for console redirection, the BIOS is operative to determine whether a device is connected to the communications port that is incompatible with the console redirection facility. If an incompatible device is detected, the BIOS will disable the console redirection facility. Otherwise, the BIOS-provided console redirection facility is enabled for operation.

19 Claims, 3 Drawing Sheets

METHOD, APPARATUS, AND COMPUTER-READABLE MEDIUM FOR DISABLING BIOS-PROVIDED CONSOLE REDIRECTION CAPABILITIES IN THE PRESENCE OF AN INCOMPATIBLE COMMUNICATIONS DEVICE

TECHNICAL FIELD

The present invention is related to the management of a remote computer system in a computer network. More particularly, the present invention is related to disabling BIOS-provided console redirection capabilities when an incompatible device is connected.

BACKGROUND OF THE INVENTION

In many computing systems, low level instruction code is used as an intermediary between the hardware components of the computing system and the operating software and other high level software executed on the computing system. This low level instruction code is known as the computer Basic Input and Output System ("BIOS"). The BIOS provides a set of software routines that allow high level software to interact with the hardware components of the computing system using standard calls.

In many computer systems, the BIOS also provides a number of other optional features that serve to enhance the capabilities of the computer system. One such feature provided by some BIOS manufacturers, is a feature for redirecting the video output of a computer system to a remote terminal via a standard RS-232 serial port. Keyboard input can also be received from the remote terminal and processed by the computer system as if it was generated by a locally connected keyboard. This feature, known as "serial redirection" or "console redirection," is commonly used on "headless" systems that run without the need for a video display adapter or keyboard.

One challenge with providing console redirection capabilities is ensuring that an incompatible device is not connected to the serial port of the host computer for which console redirection is configured. If an incompatible device, such as a mouse input device, a modem, or a serial loopback device, is installed on the communications port that has been configured for console redirection, the BIOS may fail during a power-on self test ("POST") procedure. In some cases, this failure can cause the entire computer system to crash at boot time. Not only is this very frustrating for a system administrator, but the problem can be very difficult and time consuming to diagnose and resolve. It is with respect to these considerations and others that the present invention has been made.

SUMMARY OF THE INVENTION

In accordance with the present invention, the above and other problems are solved by providing methods, systems, and computer-readable media for disabling a BIOS-provided console redirection facility in the event that an incompatible device is connected to the communications port for which console redirection is configured. By disabling the console redirection capability when an incompatible device is connected, system crashes and other problems that arise as a result of the connection of an incompatible device can be eliminated.

According to one aspect of the invention, a method is provided for disabling a BIOS-provided console redirection facility in the presence of an incompatible device. The console redirection facility redirects video text data from a computer to another computer connected via a standard RS-232 serial communications port. The console redirection facility also receives keyboard input via the communications port and utilizes the keyboard input as if the input was made at a locally connected keyboard. The console redirection facility is provided by a computer BIOS.

According to the method, a determination is first made as to whether a communications port has been enabled for utilization with a BIOS-provided console redirection feature. Such a feature is typically enabled by a user through the use of a BIOS-provided setup facility. Details regarding the configuration of the console redirection feature, such as whether the feature is enabled and the particular communications port on which the feature should be enabled, are typically stored in a non-volatile memory. Accordingly, determining whether a communications port has been enabled for utilization with a BIOS-provided console redirection feature may include reading configuration data stored in a non-volatile memory device to determine whether a communications port has been enabled for utilization with BIOS-provided console redirection.

If it is determined that a communications port has been enabled for console redirection, the BIOS is further operative to determine whether a device is connected to the communications port that is incompatible with the console redirection facility. Incompatible devices include mouse input devices, modems, serial loopback devices, and other non-terminal devices that could not be utilized to communicate over a serial connection with a host computer.

In order to determine whether a device is connected to the communications port that is incompatible with console redirection the communications port may first be enabled for communication. Data may then be transmitted on the communications port. A determination may then be made as to whether a receive buffer of the communications port contains data. This will be the case, for instance, when a non-universal asynchronous receiver transmitter ("non-UART") device is connected to the communications port. If the BIOS determines that data is contained in the receive buffer, then a device is connected to the communications port that is incompatible with console redirection. Accordingly, in such a case the BIOS will disable the console redirection feature. Otherwise, the BIOS-provided console redirection feature is enabled for operation.

According to another aspect of the invention, the BIOS-provided console redirection feature is implemented by a redirection module that is stored in a compressed format. According to this aspect, the compressed redirection module is not uncompressed or executed in the event an incompatible device is detected. If an incompatible device is not detected, the compressed redirection module is decompressed and executed to provide the console redirection capability. Once this process has completed, the BIOS may complete execution of a POST routine.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE PREFERRED EMBODIMENT

Figure 1:
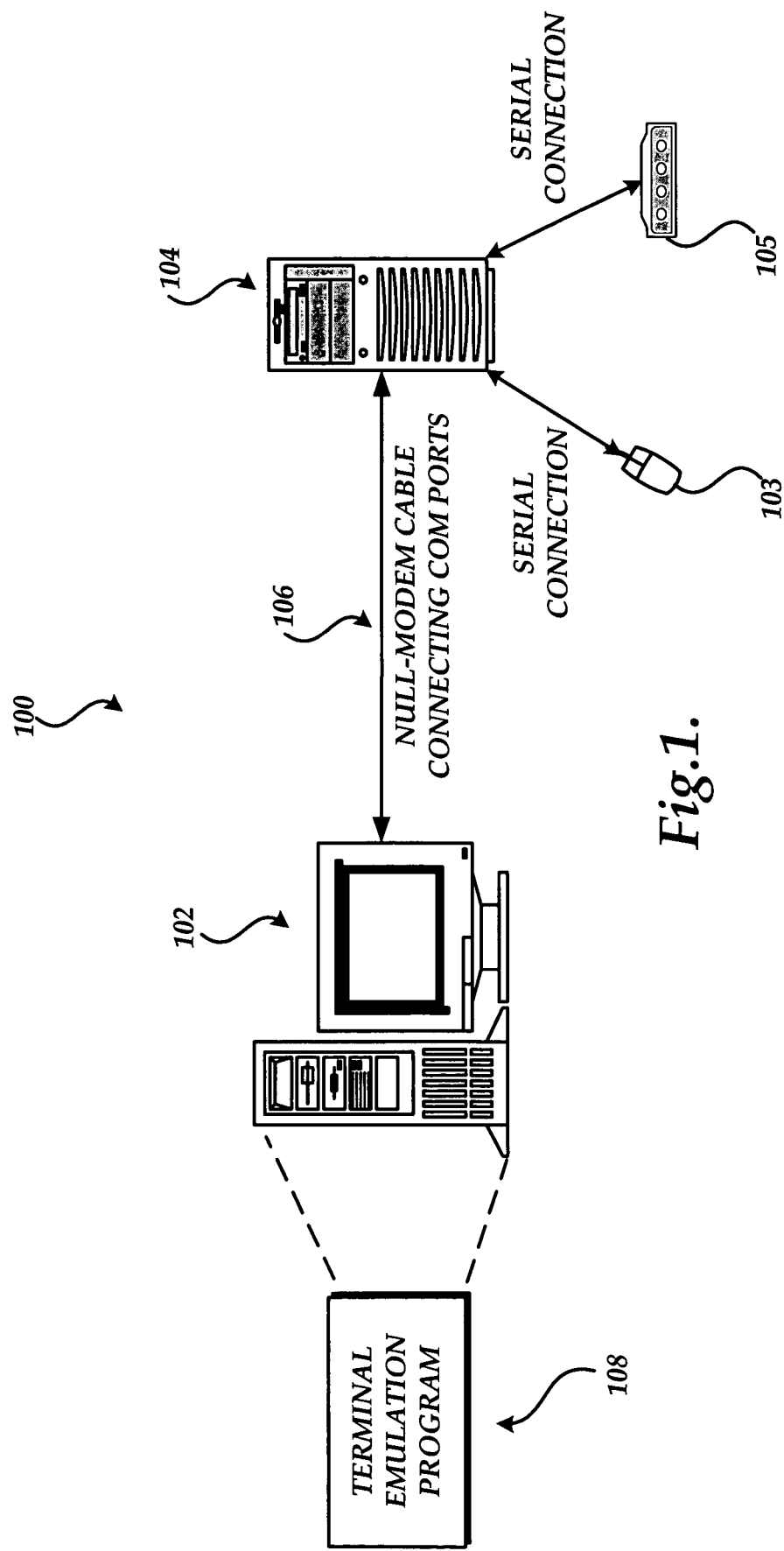
FIG. 1 is a computer system diagram showing an illustrative operating environment for the various embodiments of the present invention.

Embodiments of the present invention provide methods, systems, apparatus, and computer-readable media for disabling a BIOS-provided console redirection facility in the presence of an incompatible device. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with the execution of a computer BIOS, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative system 100 for practicing the various embodiments of the invention will be described. The system 100 includes a client computer 102 operative to execute one or more application programs, such as the terminal emulation program 108 for connecting to and communicating with a server computer 104 through a serial port connection 106. As is known by those skilled in the art, terminal emulation programs enable a computer system to connect to and communicate with other computer systems.

According to embodiments of the invention, the terminal emulation program 108 is operative to emulate a terminal that is compatible with the VT-100 terminal protocol developed by DIGITAL EQUIPMENT CORPORATION. The terminal emulation program 108 may also be operative to emulate other types of terminal protocols from other manufacturers and specified by other standards bodies. For instance, according to embodiments of the invention, the terminal emulation program 108 may be capable of supporting the ANSI standard for communicating ANSI standard text data with remote computers over a network. Of course, it will be appreciated that the terminal emulation program 108 may emulate other terminals. According to embodiments of the invention, the terminal emulation program may comprise the HYPERTERMINAL program from MICROSOFT CORPORATION of Redmond, Wash., or the MINICOM terminal emulation package for computers based on the LINUX operating system.

As illustrated in FIG. 1, the client computer 102 and the server computer 104 may be connected via a serial port connection 106. In particular, a null-modem cable is connected to a serial communication port of the client computer 102 and to a serial communication port of the server computer 104. It should be appreciated that other types of connections may be utilized to connect the client computer 102 and the server computer 104, including parallel port connections, network connections, universal serial bus ("USB"), FIREWIRE, and other types of connections known to those skilled in the art.

The communications ports of the client computer 102 and the server computer 104 must also be configured to communicate at a compatible baud rate, number of data bits, parity bits, and stop bits. For instance, the client computer 102 and the server computer 104 may be configured to communicate at 115200 baud, 8 data bits, no parity bits, and one stop bit. Other similar configurations may be utilized.

Once the client computer 102 and the server computer 104 have been connected via the serial port connection 106 and configured, the two computers are capable of communicating with one another. As will be described in greater detail below, the server computer 104 includes functionality for redirecting display screens to the client computer 102 and for receiving keyboard input from the client computer 102 as if it was generated at a keyboard connected directly to the server computer 104. Additional details regarding the operational specifics of this functionality are provided below.

As shown in FIG. 1, the server computer 104 may include any number of serial communications ports. Moreover, a number of different device types may be connected to the various serial ports, including a mouse input device 103, a modem 105, or another type of device. A serial loopback device (not shown in FIG. 1) may also be connected for performing testing and other functions. It should be appreciated that devices that do not utilize a UART, such as the mouse input device 103 and the modem 105, are incompatible with console redirection. Accordingly, if the server computer 104 is configured for console redirection on a communications port to which a mouse 103 or modem 105 is attached, problems may arise. The various embodiments of the invention seek to solve this and other problems as described below.

Figure 2:
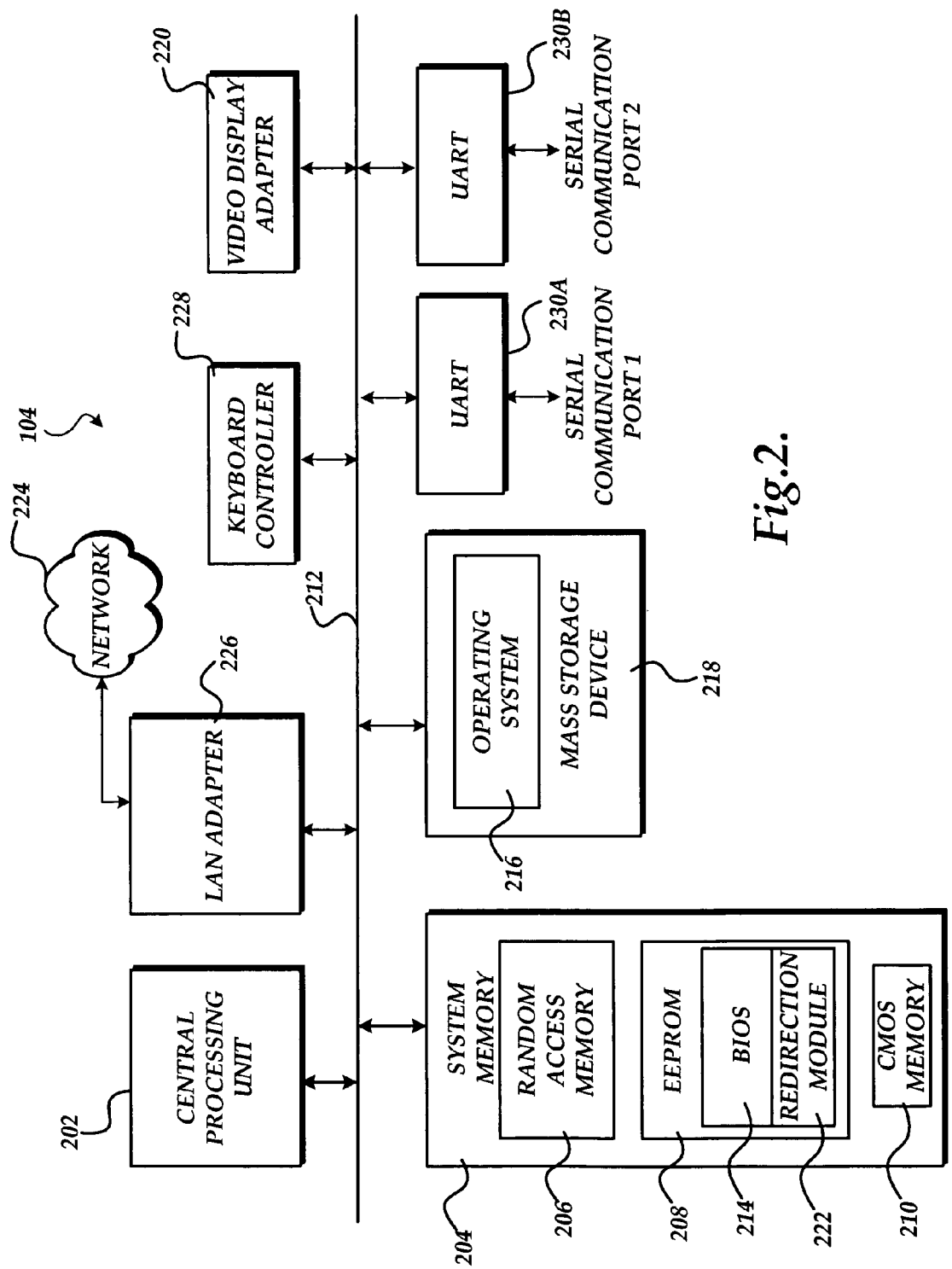
FIG. 2 is computer architecture diagram that illustrates the various components of a server computer utilized in the embodiments of the invention.

Turning now to FIG. 2, an illustrative computer architecture for a server computer 104 utilized in the various embodiments of the invention will be described. The computer architecture shown in FIG. 2 illustrates a conventional server computer, including a CPU 202, a system memory 204, including a RAM 206, an EEPROM 208 and a CMOS memory 210, and a system bus 212 that couples the memory to the CPU 202. A BIOS 214 containing the basic routines that help to transfer information between elements within the computer, such as during startup, is stored in the EEPROM 208. The BIOS 214 is executed by the CPU 202 when the server computer 104 is powered on.

The BIOS 214 performs a number of functions at startup of the server computer 104, including discovering and initializing the RAM 206, copying the contents of the BIOS 214 to the RAM 206, executing the BIOS 214 to perform a power on self-test ("POST") routine, and to pass control of the server computer 104 to an operating system 216. Once the operating system 216 has been loaded, aspects of the BIOS 214 may be utilized to manage data flow between the operating system 216 and devices attached to the server computer 104, such as a mass storage device 218, a video display adapter 220, a keyboard controller 228, a mouse and a printer. The CMOS memory 210 is a battery-backed memory device that is used by the BIOS 214 to store setting information for the server computer 104, including information regarding whether a console redirection facility has been enabled and, if so, the communication port to which the console should be redirected. This information is typically specified by a user through the use of a BIOS setup menu provided by the BIOS 214 and accessible at boot time.

As known to those skilled in the art, the BIOS 214 is an integral part of the server computer 104 and is typically shipped with the server computer 104 from the manufacturer. The BIOS 214 is made accessible to the CPU 202 on an EEPROM device 208. When the server computer 104 is powered on, the CPU 202 passes control to the BIOS 214, which is always located at the same place in the memory architecture of the server computer 104. By utilizing the BIOS 214, the operating system 216 and the applications that it executes are freed from having to understand exact details, such as hardware addresses, about input/output devices attached to the server computer 104.

As described in greater detail herein, the BIOS 214 includes program code for redirecting screen displays of the server computer 104 to remote terminal via a serial communications port. In particular, the BIOS 214 also includes a redirection module 222 which is an executable program module containing program code for redirecting video text data from the server computer 104 to the client computer 102, or other type of terminal. In order to redirect video text data and providing other type of serial communications, the server computer 104 includes one or more universal asynchronous receiver/transmitters ("UART") 230A-230B. The UARTs 230A-230B provide the hardware necessary for serial communications.

According to one embodiment of the invention, the redirection module 222 is stored in the EEPROM 208 in a compressed format. When the redirection module 222 is enabled for operation, the BIOS 214 uncompresses the redirection module 222 to the RAM 206. The uncompressed redirection code may then be executed. As will be described in greater detail below, if a device is detected on the communications port for which console redirection is enabled, the BIOS 214 will not decompress or execute the redirection module 222. Additional details regarding the operation of the console redirection module 222 will be described in greater detail below with respect to FIG. 3.

The server computer 104 further includes a mass storage device 218 for storing an operating system 216, application programs, and other program modules. The mass storage device 218 is connected to the CPU 202 through a mass storage controller (not shown) connected to the bus 212. The mass storage device 218 and its associated computer-readable media, provide non-volatile storage for the server computer 104. Although the description of computer-readable media contained herein refers to a mass storage device, such as a hard disk or CD-ROM drive, it should be appreciated by those skilled in the art that computer-readable media can be any available media that can be accessed by the server computer 104.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the server computer 104.

According to various embodiments of the invention, the server computer 104 may operate in a networked environment using logical connections to remote computers through a network 224, such as the Internet. The server computer 104 may connect to the network 224 through a network interface unit 226 connected to the bus 212. It should be appreciated that the network interface unit 226 may also be utilized to connect to other types of networks and remote computer systems. The server computer 104 may also include a keyboard controller 228 for receiving input from a keyboard and a video display adapter 220 for providing output to a display screen. In the various embodiments of the invention described herein, it is not necessary for a keyboard or a display screen to be connected to the server computer 104.

Figure 3:
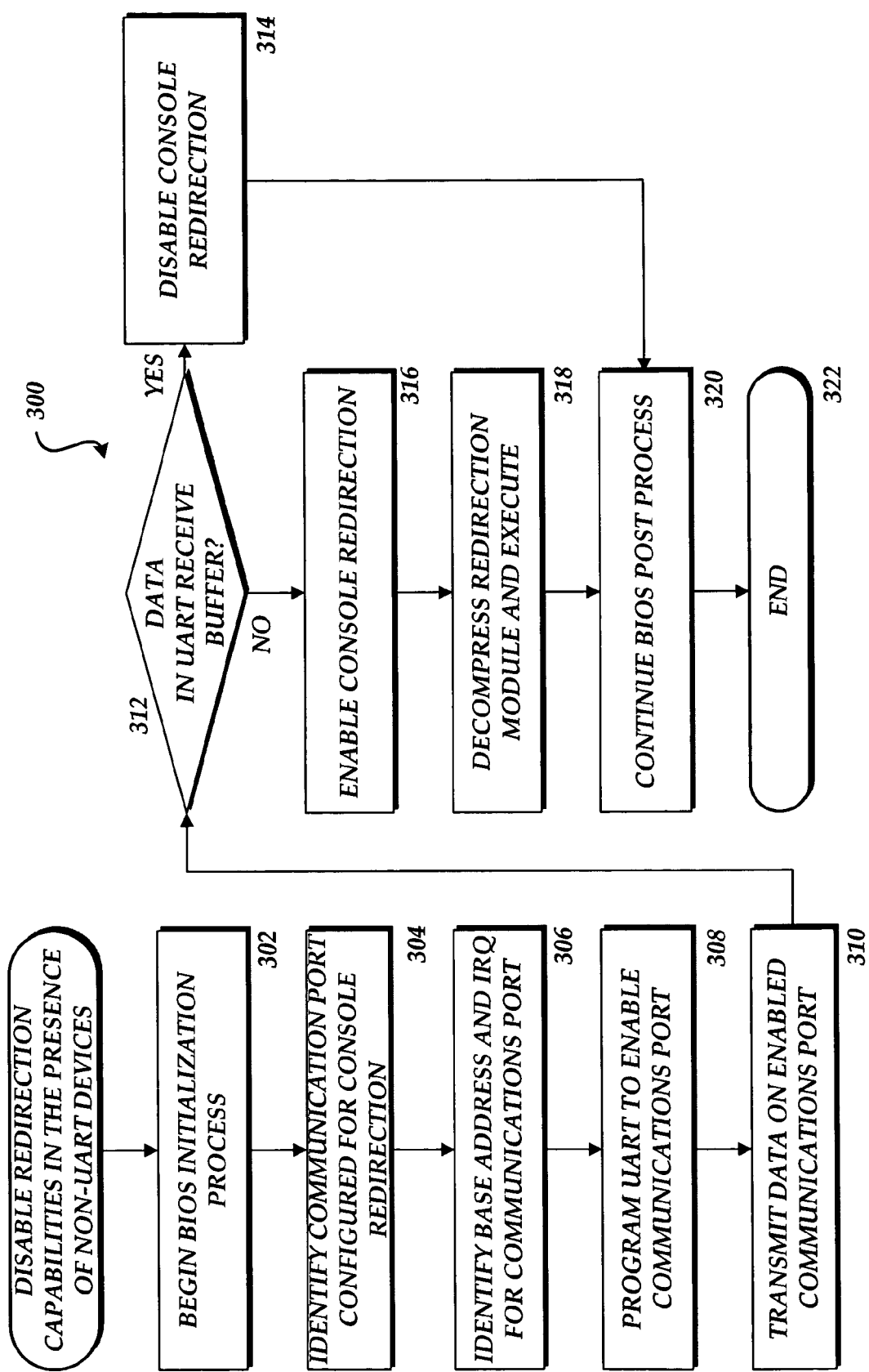
FIG. 3 is a flow diagram illustrating an exemplary process for disabling a BIOS-provided console redirection facility when an incompatible device is detected according to one embodiment of the invention.

Referring now to FIG. 3, an illustrative routine 300 will be described for disabling a BIOS-provided console redirection facility in the presence of an incompatible device according to one embodiment of the invention. FIG. 3 shows illustrative logical operations in the environment described above with reference to FIGS. 1 and 2. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 300 begins at operation 302, where the BIOS 214 begins its initialization process. The initialization process may include setting up various memory locations, decompressing compressed program modules, and beginning a POST routine. As a part of the initialization process, the BIOS 214 determines whether console redirection is enabled and whether an incompatible device is connected to the communications port on which redirection is enabled. If an incompatible device is connected, the BIOS disables the redirection facility. Otherwise, the BIOS enables the redirection facility and begins the redirection process. These functions are described in greater detail below.

From operation 302, the routine 300 continues to operation 304. At operation 304, the BIOS 214 identifies the communications port on which console redirection is enabled. This may be performed, for instance, by examining data stored in the CMOS memory 210 to identify the communications port that has been designated by a user for redirection. Once the communications port on which redirection is to take place has been identified, the routine 300 continues to operation 306. At operation 306, the BIOS 214 identifies the base address and the interrupt request ("IRQ") port for the communications port to be utilized for redirection. This information allows the BIOS 214 to communicate with the communications port and to configure the appropriate UART 230A-230B for communication.

From operation 306, the routine 300 continues to operation 308 where the BIOS 214 communicates with the appropriate UART 230A-230B utilizing the base address and IRQ identified at operation 306. In particular, the BIOS 214 programs the appropriate registers of the UART to enable the communications port on which console redirection is to be enabled. Other parameters stored in the CMOS memory 210, such as the baud divisor and communications port number may be utilized to configure the appropriate UART.

Once the appropriate UART 230A-230B has been configured for communication, the routine 300 continues to operation 310. At operation 310, data is transmitted over the enabled communications port. In particular, according to one embodiment of the invention, the data terminal ready ("DTR") line is toggled in the modem control register. On standard IBM-compatible personal computers, this register has the address 3FC/2FC. If the device connected to the communications port is a non-UART device, such as a mouse, the device will respond to the toggling of the DTR line by sending data to the UART of the server computer 104. Accordingly, the routine 300 continues from operation 310 to operation 312, where a determination is made as to whether a receive buffer of the UART contains any data. In particular, the line status register (3FD/2FD) in a standard IBM-compatible personal computer can be read to make this determination. Alternatively, the interrupt identification register (3FA/2FA) may be checked. This is helpful, for instance, when determining whether a serial loopback device, which is also incompatible with console redirection, is connected to the communications port.

If, at decision operation 312, the BIOS 214 determines that data was received, the routine 300 branches to operation 314. At operation 314, the BIOS 214 disables the console redirection facility. In particular, the BIOS 214 does not decompress the compressed redirection module 222 stored in the EEPROM 208. The BIOS 214 also does not execute the redirection code or perform any other redirection processing, despite the fact that the BIOS console redirection facility has been enabled by a user. Another such determination will be made on each subsequent boot of the server computer 104 in order to enable the redirection facility should the incompatible device be removed and an appropriate UART cable is connected. From operation 314, the routine 300 continues to operation 320, where the BIOS 214 continues the initialization and POST processes.

If, however, at decision operation 312, the BIOS 214 determines that data was not received at the UART, the routine 300 continues to operation 316. At operation 316, the console redirection facility is enabled by the BIOS 214. To enable the facility, the routine 300 continues to operation 318, where the BIOS 214 decompresses the redirection module 222 to the RAM 206. Once the redirection module 222 has been decompressed, it may be executed in order to provide the actual BIOS console redirection capability. From operation 320, the routine 300 continues to operation 320, where the initialization and POST process is continued. The operation then continues to operation 322, where it ends.

It will be appreciated that embodiments of the present invention provide methods, systems, apparatus, and computer-readable media for disabling a BIOS-provided console redirection facility in the presence of an incompatible device. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method for disabling console redirection capabilities provided by a basic input and output system (BIOS) in the presence of an incompatible device, the method comprising:
   determining whether a communications port has been enabled for utilization with a BIOS-provided console redirection feature during a BIOS initialization;
   in response to determining that a communications port has been enabled for utilization with a BIOS-provided console redirection feature, determining whether a device connected to the communications port is incompatible with console redirection;
   in response to determining that a device connected to the communications port is incompatible with console redirection, disabling the BIOS-provided console redirection feature during a BIOS power-on self test procedure.

2. The method of claim 1, wherein determining whether a communications port has been enabled for utilization with a BIOS-provided console redirection feature comprises reading configuration data stored in a non-volatile memory device to determine whether the communications port has been enabled for utilization with a BIOS-provided console redirection feature.

3. The method of claim 2, wherein determining whether a device connected to the communications port is incompatible with console redirection comprises:
   enabling the communications port for communication;
   transmitting first data on the communications port for reception by the device;
   determining whether a receive buffer of the communications port contains second data from the device following the transmission of the first data on the communications port; and
   determining that the device connected to the communications port is incompatible with console redirection in response to determining that the receive buffer contains the second data from the device following the transmission of the first data on the communications port.

4. The method of claim 3, wherein the BIOS-provided console redirection feature is implemented by a compressed redirection module and wherein disabling the BIOS-provided console redirection feature comprises not uncompressing or executing the redirection module.

5. The method of claim 4, further comprising enabling the BIOS-provided console redirection feature in response to determining that a device connected to the communications port is compatible with console redirection.

6. The method of claim 5, wherein enabling the BIOS-provided console redirection feature comprises decompressing the compressed redirection module and executing the redirection module.

7. The method of claim 6, wherein the device that is incompatible comprises one of a mouse input device, a modem, or a serial loopback device connected to the communications port.

8. A computer storage medium having computer-executable instructions stored thereon which, when executed by a computer, cause the computer to perform the method of claim 1.

9. A method for disabling basic input and output system (BIOS) provided console redirection capabilities in the presence of a non-universal-asynchronous-receiver-transmitter (non-UART) device, the method comprising:

during a BIOS initialization, determining whether a communications port has been enabled for utilization with a BIOS-provided console redirection feature;

in response to determining that a communications port has been enabled for utilization with a BIOS-provided console redirection feature, determining whether a non-UART device is connected to the communications port; and in response to determining that a non-UART device is connected to the communications port, disabling the BIOS-provided console redirection feature prior to completing the BIOS initialization.

10. The method of claim 9, wherein determining whether a communications port has been enabled for utilization with a BIOS-provided console redirection feature comprises reading configuration data stored in a non-volatile memory device to determine whether the communications port has been enabled for utilization with a BIOS-provided console redirection feature.

11. The method of claim 10, wherein determining whether a non-UART device is connected to the communications port comprises:

enabling the communications port for communication;

transmitting first data on the communications port for reception by a device connected to the communications port;

determining whether a receive buffer of the communications port contains second data from the device following the transmission of the first data on the communications port; and determining that a non-UART device is connected to the communications port in response to determining that the receive buffer contains the second data from the device following the transmission of the first data on the communications port.

12. The method of claim 11, wherein the BIOS-provided console redirection feature is implemented by a compressed redirection module and wherein disabling the BIOS-provided console redirection feature comprises not uncompressing or executing the redirection module.

13. The method of claim 12, further comprising enabling the BIOS-provided console redirection feature in response to determining that a UART device is connected to the communications port.

14. The method of claim 13, wherein enabling the BIOS-provided console redirection feature comprises decompressing the compressed redirection module and executing the redirection module.

15. The method of claim 14, wherein the non-UART device comprises one of a mouse input device, a modem, or a serial loopback device connected to the communications port.

16. The method of claim 15, further comprising executing a BIOS power-on self test procedure.

17. A computer storage medium having computer-executable instructions stored thereon which, when executed by a computer, cause the computer to perform the method of claim 9.

18. The method of claim 7, further comprising executing an operating system in response to executing the BIOS power-on self test procedure.

19. The method of claim 9, further comprising executing an operating system following completing the BIOS initialization.

* * * * *